United States Patent
Kouno et al.

(10) Patent No.: US 9,413,224 B2
(45) Date of Patent: Aug. 9, 2016

(54) DC TO AC POWER CONVERSION DEVICE USING SWITCHING ELEMENTS

(71) Applicant: Kabushiki Kaisha Toshiba, Minato-ku (JP)

(72) Inventors: Yuusuke Kouno, Tachikawa (JP); Yoichi Morishima, Sumida (JP); Yoshinori Sugimoto, Iruma (JP); Takao Suginohara, Koganei (JP); Teruya Hamai, Fuchu (JP); Hiroaki Matsumoto, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/629,782

(22) Filed: Feb. 24, 2015

(65) Prior Publication Data
US 2015/0280546 A1  Oct. 1, 2015

(30) Foreign Application Priority Data
Mar. 28, 2014  (JP) .................................. 2014-069757

(51) Int. Cl.
H02M 1/36 (2007.01)
H02M 1/00 (2006.01)
H02M 7/5387 (2007.01)

(52) U.S. Cl.
CPC *H02M 1/36* (2013.01); *H02M 1/00* (2013.01); *H02M 7/53871* (2013.01); *H02M 2001/0025* (2013.01)

(58) Field of Classification Search
CPC ...................................................... H02M 1/36
See application file for complete search history.

(56) References Cited

U.S. PATENT DOCUMENTS

| 5,115,386 | A * | 5/1992 | Shirahama | H02M 7/53871 307/66 |
| 6,088,246 | A * | 7/2000 | Okuyama | H02M 7/53873 363/132 |
| 7,589,486 | B2 * | 9/2009 | Yamada | H02P 23/0004 318/400.02 |
| 9,083,200 | B2 * | 7/2015 | Tsai | H02J 9/062 |
| 2014/0056041 | A1 | 2/2014 | Zhu et al. | |

FOREIGN PATENT DOCUMENTS

JP    2013 78208    4/2013

OTHER PUBLICATIONS

Extended European Search Report issued Apr. 22, 2016 in Patent Application No. 15156249.3.

(Continued)

*Primary Examiner* — Emily P Pham
(74) *Attorney, Agent, or Firm* — Oblon, McClelland, Maier & Neustadt, L.L.P.

(57) ABSTRACT

A power conversion device includes a main circuit unit, a first current detector, a second current detector, a voltage detector, and a controller. The main circuit unit is connected to a DC voltage source and an AC power system. The main circuit unit includes an inverter including a plurality of switching elements. The main circuit unit converts a DC power to an AC power. The controller decides that whether the output current of the inverter falls within a range between an upper limit value and a lower limit value, stop an operation of the switching elements when the output current of the inverter falls beyond the range, and resume the operation of the switching elements when the output current of the inverter returns into the range.

20 Claims, 11 Drawing Sheets

(56) References Cited

OTHER PUBLICATIONS

Youngsang Bae, et al., "Implemental Control Strategy for Grid Stabilization of Grid-Connected PV System Based on German Grid Code in Symmetrical Low-to-Medium Voltage Network" IEEE Transactions on Energy Conversion, vol. 28, No. 3, Sep. 1, 2013. pp. 619-631.

Yongheng Yang, et al., "Benchmarking of Grid Fault Modes in Single-Phase Grid-Connected Photovoltaic Systems" IEEE Transactions on Industry Applications, vol. 49, No. 5, Sep. 1, 2013, pp. 2167-2176.

S.M. Muyeen, et al. "Variable speed wind turbine generator system with current controlled voltage source inverter" Energy Coversion and Management, Elservier Science Publishers, vol. 52, No. 7 Feb. 11, 2011, pp. 2688-2694.

Mansour Mohseni, et al., "Low Voltage Ride-Through of DFIG Wind Turbines Complying with Western-Power Grid Code in Australia" Power and Energy Society General Meeting, Jul. 24, 2011, pp. 1-8.

* cited by examiner

INSTANTANEOUS DROP OCCURS

FIG. 5A
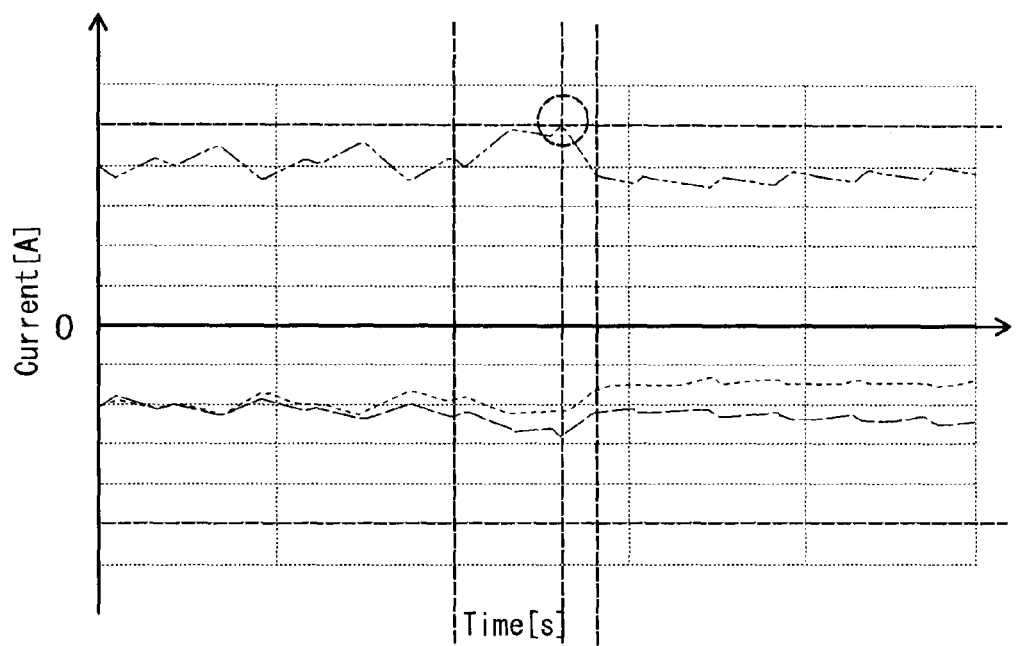
FIG. 5B
FIG. 5C
FIG. 5D
FIG. 5E
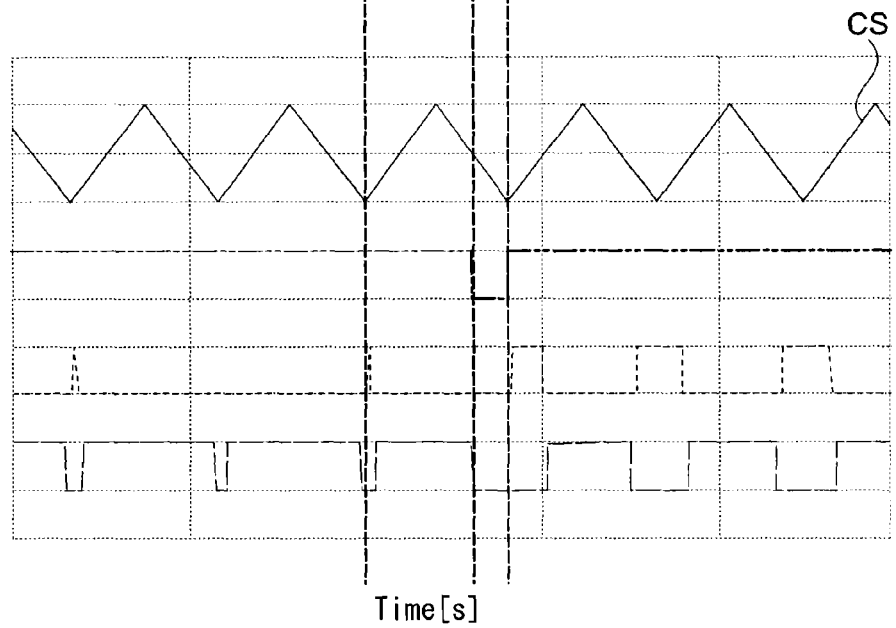
INSTANTANEOUS DROP OCCURS

DC TO AC POWER CONVERSION DEVICE USING SWITCHING ELEMENTS

CROSS-REFERENCE TO RELATED APPLICATIONS

This application is based upon and claims the benefit of priority from Japanese Patent Application No. 2014-069757, filed on Mar. 28, 2014; the entire contents of which are incorporated herein by reference.

FIELD

Embodiments described herein relate generally to a power conversion device.

BACKGROUND

There is known a power conversion device for converting DC voltage to AC voltage for output to a power system. The DC voltage is inputted from a DC voltage source such as a solar cell panel. In the power conversion device, upon an instantaneous voltage drop on the power system, overcurrent may occur at the output and stop the operation. For instance, in the case where a large number of power conversion devices are connected to the power system, simultaneous stop of the power conversion devices may lose the balance of power supplied to the load. This may make the power system unstable. In this context, there is known a power conversion device as follows. An instantaneous voltage drop is detected based on the system voltage. The output is temporarily stopped to continue the action. Thus, abrupt change in the power system is suppressed. However, in the case of detecting an instantaneous voltage drop based on the system voltage, there is concern about unnecessarily decreasing the output.

BRIEF DESCRIPTION OF THE DRAWINGS

FIGS. 5A to 5E are graphs showing an example of the operation of the controller according to the first embodiment;

DETAILED DESCRIPTION

Figure 1:
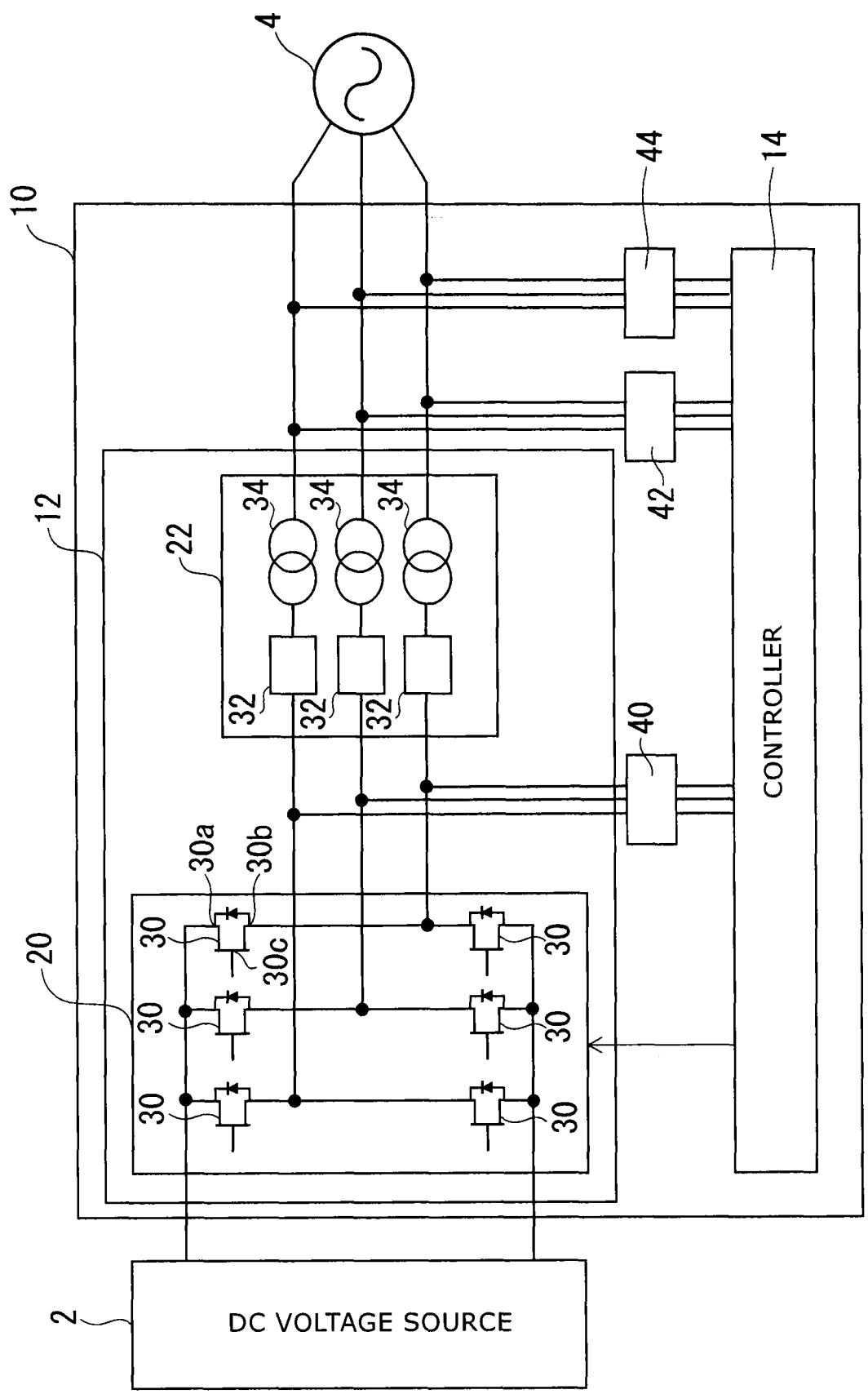
FIG. 1 is a block diagram schematically showing a power conversion device according to a first embodiment.

According to one embodiment, a power conversion device includes a main circuit unit, a first current detector, a second current detector, a voltage detector, and a controller. The main circuit unit is connected to a DC voltage source and an AC power system. The main circuit unit includes an inverter. The inverter includes a plurality of switching elements. The main circuit unit converts a DC power supplied from the DC voltage source to an AC power adapted to the AC power system by turning on/off of the switching elements. The main circuit unit outputs the AC power to the AC power system. The first current detector detects an output current of the inverter. The second current detector detects a current of the AC power system. The voltage detector detects a voltage of the AC power system. The controller controls on/off of the switching elements based on a voltage reference and a carrier signal. The voltage reference and the carrier signal are periodically changed. A frequency of the carrier signal is higher than a frequency of the voltage reference. The controller is configured to perform a first operation and a second operation. The first operation has deciding that whether the output current of the inverter falls within a range between an upper limit value and a lower limit value, stopping an operation of the switching elements when the output current of the inverter falls beyond the range, confirming the output current of the inverter when the carrier signal takes a prescribed value after the controller stops the operation of the switching elements, and resuming the operation of the switching elements when the output current of the inverter returns into the range. The second operation has calculating an output power of the main circuit unit based on the output current of the inverter detected by the first current detector, the current of the AC power system detected by the second current detector, and the voltage of the AC power system detected by the voltage detector, calculating a current command value of the output current of the inverter from the output power of the main circuit unit, and controlling an output of the main circuit unit by correcting the voltage reference based on the current command value of the output current of the inverter.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In this specification and the drawings, components similar to those described previously with reference to earlier figures are labeled with like reference numerals, and the detailed description thereof is omitted appropriately.

First Embodiment

FIG. 1 is a block diagram schematically showing a power conversion device according to a first embodiment.

As shown in FIG. 1, the power conversion device 10 is connected to a DC voltage source 2 and a power system 4. The power conversion device 10 is removably connected to the DC voltage source 2 and the power system 4 through e.g. connectors. In this specification, the term "connected" includes not only the case of being connected in direct contact, but also the case of being electrically connected through another conductive member and the like. The term "connected" also includes the case of being magnetically coupled through a transformer and the like.

The DC voltage source 2 supplies DC power to the power conversion device 10. The DC voltage source 2 is e.g. a solar cell panel. The DC voltage source 2 may be e.g. a gas turbine engine. The DC voltage source 2 may be an arbitrary power supply capable of supplying DC power.

The power system 4 is e.g. a transmission line for supplying power to a customer's power receiving facility. The power supplied by the power system 4 is AC power. The power supplied by the power system 4 is e.g. three-phase AC power. The power system 4 is e.g. a transmission line of the commercial power supply. The voltage of the AC power of the power system 4 is e.g. 100 V (effective value). The frequency of the AC power of the power system 4 is e.g. 50 Hz or 60 Hz. The power of the power system 4 may be single-phase AC power. The power system 4 may be e.g. a transmission line in a private power generation system.

The power conversion device 10 converts the DC power supplied from the DC voltage source 2 to AC power adapted to the power system 4. The power conversion device 10 outputs the converted AC power to the power system 4. The power conversion device 10 outputs active power to the power system 4. The power conversion device 10 is what is called a power conditioner. The term "outputting power to the power system 4" includes not only what is called the reverse power flow for supplying power to a transmission line and the like, but also the case of supplying power to a line load (such as electronic equipment) through e.g. a switchboard or distribution board.

The power conversion device 10 includes a main circuit unit 12 and a controller 14. The main circuit unit 12 includes an inverter 20 and a filter/transformer unit 22. The inverter 20 includes a plurality of switching elements 30. The inverter 20 is connected to the DC voltage source 2. The inverter 20 converts the DC power supplied from the DC voltage source 2 to AC power by turning on/off the switching elements 30.

In this example, the inverter 20 is a three-phase inverter in which six switching elements 30 are bridge-connected. The inverter 20 converts DC power to three-phase AC power. For instance, in the case where the power system 4 is single-phase AC, the inverter 20 is configured as a single-phase inverter in which four switching elements 30 are bridge-connected. Thus, the inverter 20 may be a single-phase inverter.

Each switching element 30 is e.g. a self-turn-off element. More specifically, for instance, GTO (gate turn-off thyristor) or IGBT (insulated gate bipolar transistor) is used for the switching element 30.

Each switching element 30 includes a pair of main electrodes 30a, 30b and a control electrode 30c for controlling the current flowing between the main electrodes 30a, 30b. The control electrode 30c is e.g. a gate electrode.

Each switching element 30 is switched between the on-state and the off-state in response to the voltage applied to the control electrode 30c. Each switching element 30 is turned to the on-state e.g. when a first voltage is applied to the control electrode 30c. Each switching element 30 is turned to the off-state when a second voltage lower than the first voltage is applied to the control electrode 30c, or when no voltage is applied to the control electrode 30c. The off-state is a state in which there is substantially no current flowing between the main electrodes 30a, 30b. The off-state may be a state in which e.g. an extremely weak current not affecting power conversion in the inverter 20 flows between the main electrodes 30a, 30b. In other words, the on-state is a first state in which a current flows between the main electrodes 30a, 30b. The off-state is a second state in which the current flowing between the main electrodes 30a, 30b is lower than that in the first state. In this example, each switching element 30 is of the normally-off type. Each switching element 30 may be of the normally-on type.

Furthermore, a diode is connected to each switching element 30. The diode is connected parallel to the main electrodes 30a, 30b of each switching element 30. The forward direction of each diode is set to be opposite to the direction of the current flowing between the main electrodes 30a, 30b. That is, each diode is what is called a freewheeling diode.

The filter/transformer unit 22 includes a filter 32 and a transformer 34. The filter/transformer unit 22 includes e.g. three filters 32 provided for respective phases of the three-phase AC power, and three transformers 34. Each filter 32 suppresses harmonic components of the AC power outputted from the inverter 20. For instance, each filter 32 brings the AC power outputted from the inverter 20 close to a sine wave. Each transformer 34 transforms e.g. the voltage of the AC power outputted from the filter 32. The transformer 34 outputs the transformed AC power to the power system 4. For instance, each transformer 34 transforms the AC power outputted from the inverter 20 to AC power adapted to the power system 4. Thus, the main circuit unit 12 converts the DC power supplied from the DC voltage source 2 to AC power adapted to the power system 4.

The controller 14 is a processor such as CPU and MPU. For instance, the controller 14 reads a prescribed program from a memory, not shown, and sequentially processes the program. Thus, the controller 14 generally controls the sections of the power conversion device 10. The memory storing the program may be provided in the controller 14. The memory may be provided separately from the controller 14, and connected to the controller 14.

The controller 14 is connected to each switching element 30 of the inverter 20. More specifically, the controller 14 is connected to the control electrode 30c of each switching element 30. The controller 14 controls on/off of each switching element 30. The controller 14 controls on/off of each switching element 30 by e.g. inputting a control signal to the control electrode 30c of the switching element 30 and changing the voltage of the control signal. The control signal is what is called a gate signal. Thus, the controller 14 converts e.g. the DC power to AC power of the voltage and frequency adapted to the power system 4.

The controller 14 is connected to e.g. an internal power supply, not shown, and operated by the power supplied from the internal power supply. The internal power supply is connected to the DC voltage source 2 and the power system 4. The internal power supply includes e.g. a charge accumulation element such as a battery so that the power supplied from the DC voltage source 2 and the power system 4 is accumulated in the charge accumulation element. The internal power supply supplies the power accumulated in the charge accumulation element to the controller 14. This suppresses e.g. the occurrence of instantaneous voltage drop in the controller 14. The internal power supply is e.g. an uninterruptible power supply. The internal power supply may be provided in the power conversion device 10, or provided separately from the power conversion device 10.

Figure 2:
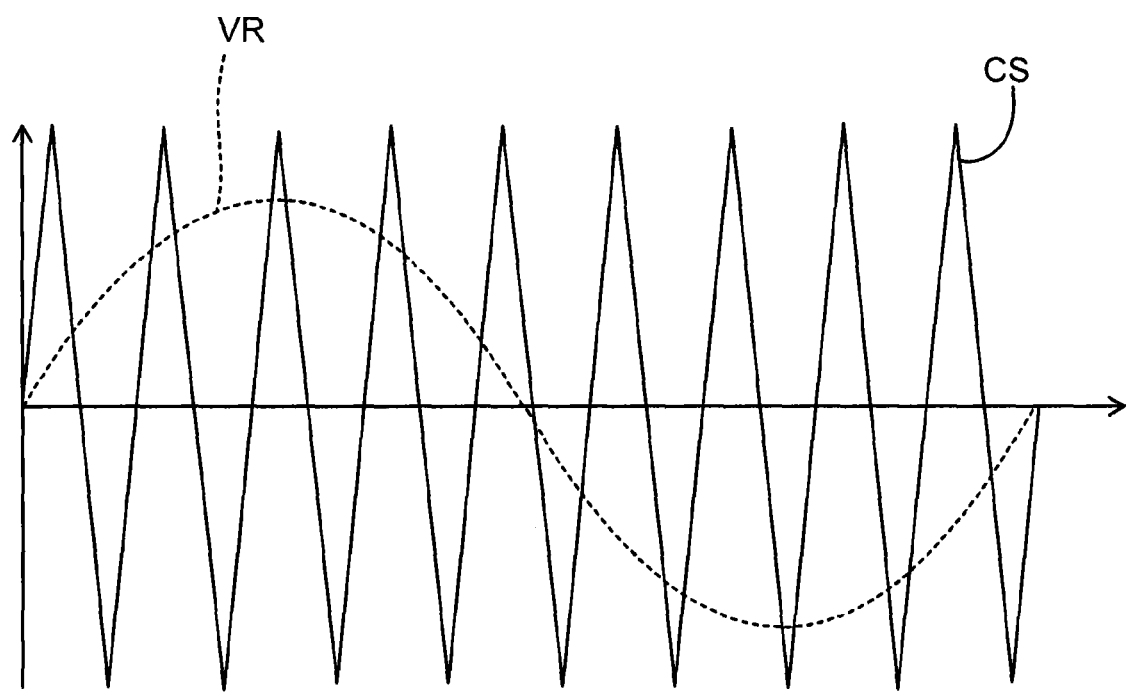
FIG. 2 is a graph schematically showing the operation of the controller according to the first embodiment.

FIG. 2 is a graph schematically showing the operation of the controller according to the first embodiment.

As shown in FIG. 2, the controller 14 controls on/off of each switching element 30 based on the carrier signal CS and the voltage reference VR. The controller 14 sets the voltage reference VR for each phase of the three-phase AC power. That is, in this example, the controller 14 sets three voltage references VR. For instance, the three voltage references VR are set with phases shifted by 120 degrees each. On the other hand, the carrier signal CS is commonly used for each phase. The voltage reference VR and the carrier signal CS change periodically. The voltage reference VR is e.g. a sine wave. The frequency of the voltage reference VR is set depending on the frequency of the AC power of the power system 4. The frequency of the voltage reference VR is e.g. 50 Hz or 60 Hz. The carrier signal CS is e.g. a triangular wave. The carrier signal CS may be a sawtooth wave or trapezoidal wave. The frequency of the carrier signal CS is higher than the frequency of the voltage reference VR. The frequency of the carrier signal CS is e.g. 1 kHz or more.

The controller 14 compares the voltage reference VR with the carrier signal CS. For instance, the controller 14 turns on the switching element 30 on the upper arm side and turns off the switching element 30 on the lower arm side when the voltage reference VR is more than or equal to the carrier signal CS. In this case, the controller 14 turns off the switching element 30 on the upper arm side and turns on the switching element 30 on the lower arm side when the voltage reference VR is less than the carrier signal CS. Thus, the controller 14 alternately turns on/off the switching element 30 on the upper arm side and the switching element 30 on the lower arm side. Conversely, the controller 14 may turn off the switching element 30 on the upper arm side and turn on the switching element 30 on the lower arm side when the voltage reference VR is more than or equal to the carrier signal CS.

Returning to FIG. 1, the power conversion device 10 further includes a first current detector 40, a second current detector 42, and a voltage detector 44.

The first current detector 40 detects the output current of the inverter 20 (hereinafter referred to as inverter current). The first current detector 40 detects e.g. the inverter current of each phase of the three-phase AC power outputted from the inverter 20. The first current detector 40 is connected to the controller 14. The first current detector 40 inputs the detected inverter current of each phase to the controller 14.

The second current detector 42 detects the current of the power system 4 (hereinafter referred to as system current). The system current is, in other words, the output current of the main circuit unit 12. The second current detector 42 detects e.g. the system current of each phase of the three-phase AC power of the power system 4. The second current detector 42 is connected to the controller 14. The second current detector 42 inputs the detected system current of each phase to the controller 14.

The voltage detector 44 detects the voltage of the power system 4 (hereinafter referred to as system voltage). The system voltage is, in other words, the output voltage of the main circuit unit 12. The voltage detector 44 detects e.g. the system voltage of each phase of the three-phase AC power of the power system 4. The voltage detector 44 is connected to the controller 14. The voltage detector 44 inputs the detected system voltage of each phase to the controller 14.

The controller 14 detects anomaly of power of the power system 4 based on the detection results of the second current detector 42 and the voltage detector 44. The controller 14 stops the operation of the main circuit unit 12 when the system voltage and the system current fall outside a prescribed operation range. The controller 14 is subjected to what is called an error stop. That is, the controller 14 stops the output of AC power from the main circuit unit 12. In the case of the error stop, the controller 14 continues the stop state until a prescribed recovery process is performed. The recovery process includes e.g. restarting the power supply of the power conversion device 10 and inputting a recovery command.

The controller 14 detects e.g. an instantaneous voltage drop based on the detection result of the voltage detector 44. The controller 14 detects an instantaneous voltage drop e.g. when the duration of the state of a remaining voltage ratio of 20% or less is 1 second or less. The remaining voltage ratio refers to the ratio of the voltage value of the system voltage after the occurrence of voltage drop to the voltage value of the system voltage immediately before the occurrence.

The power conversion device complies with the FRT (fault ride through) requirement for continuing action even at the time of disturbance in the power system 4. Thus, the controller 14 continues action during the period of detecting an instantaneous voltage drop. On the other hand, for instance, when the state of a remaining voltage ratio of 20% or less is continued longer than 1 second, the controller 14 determines that the system voltage has fallen outside the operation range and is subjected to an error stop.

Figure 3:
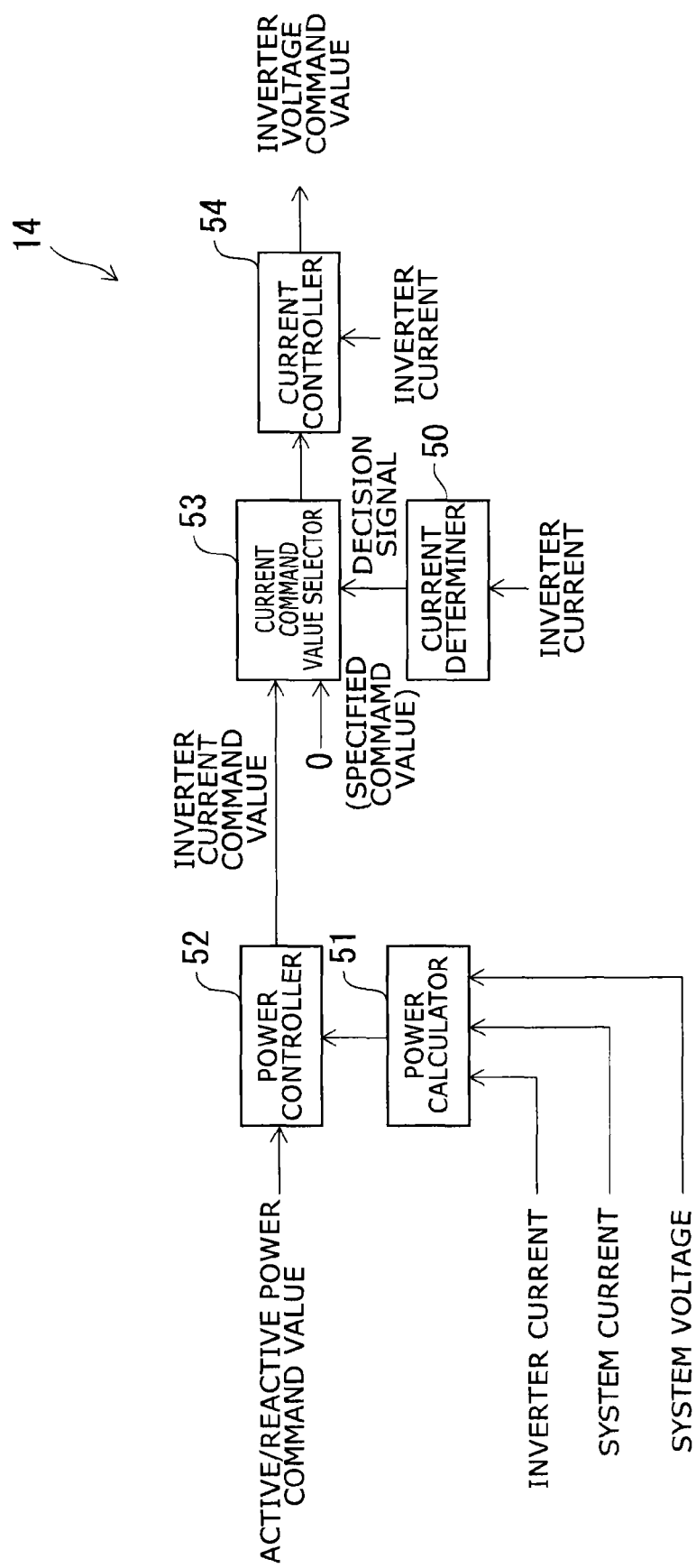
FIG. 3 is a functional block diagram schematically showing part of the controller according to the first embodiment.

FIG. 3 is a functional block diagram schematically showing part of the controller according to the first embodiment.

As shown in FIG. 3, the controller 14 includes a current determiner 50, a power calculator 51, a power controller 52, a current command value selector 53, and a current controller 54. The current determiner 50 is inputted with the inverter current detected by the first current detector 40. The current determiner 50 decides whether the inputted inverter current is more than or equal to an upper limit value UL, and whether the inverter current is less than or equal to a lower limit value LL (see FIG. 4A). That is, the current determiner 50 decides whether the inverter current falls within the range between the upper limit value UL and the lower limit value LL. The current determiner 50 is inputted with e.g. a three-phase inverter current. The current determiner 50 decides whether the inverter current falls within the range between the upper limit value UL and the lower limit value LL for each phase. The current determiner 50 outputs a decision signal indicating the result of the above decision.

FIGS. 4A to 5E are graphs showing an example of the operation of the controller according to the first embodiment.

Figure 4A:
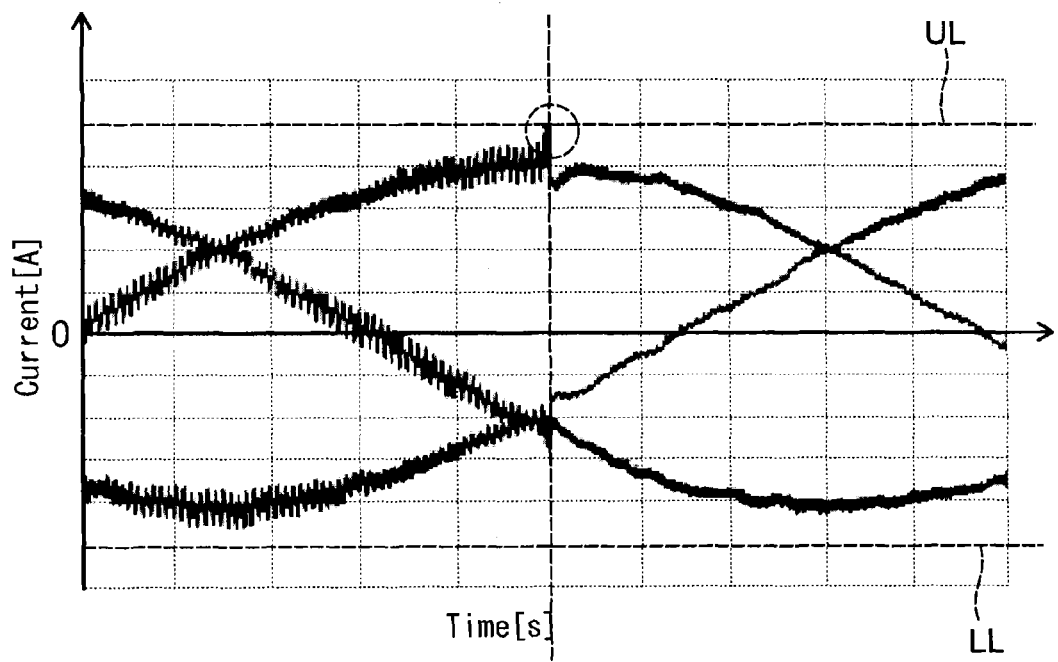
FIGS. 4A and 4B are graphs showing an example of the operation of the controller according to the first embodiment.

FIG. 4A shows an example of the inverter current.

Figure 4B:
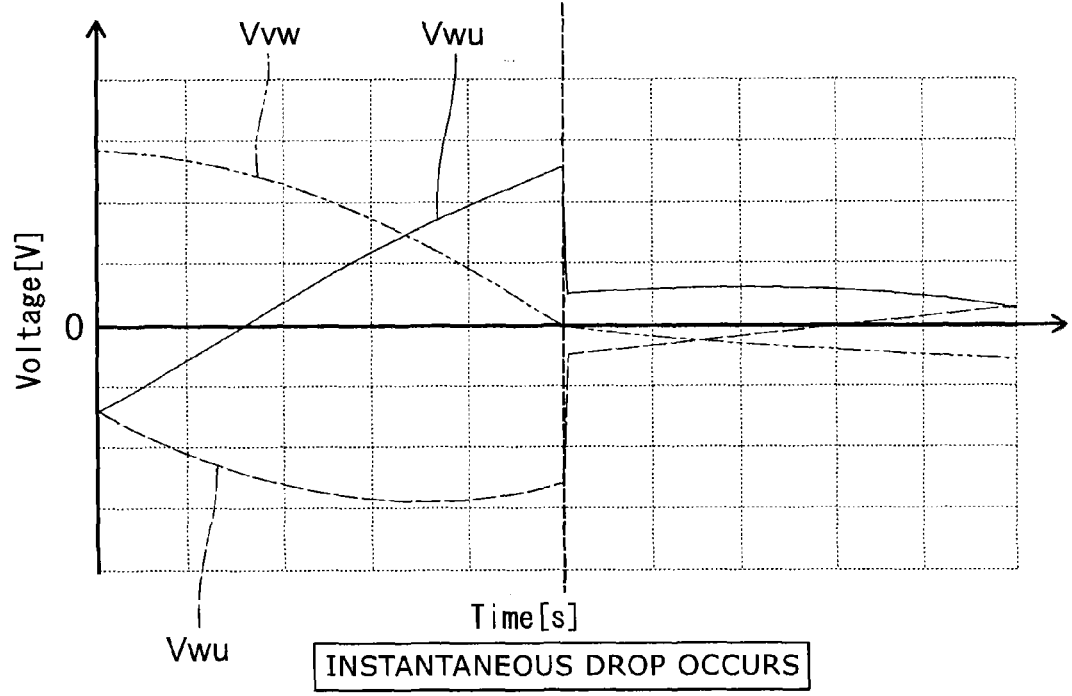

FIG. 4B shows an example of the system voltage.

FIG. 5A shows an example of the inverter current. In FIG. 5A, part of the inverter current shown in FIG. 4A is enlarged along the time axis.

FIG. 5B shows an example of the carrier signal CS.

FIG. 5C shows an example of the operation signal allowing or stopping the operation of each switching element 30.

FIG. 5D shows an example of the control signal inputted to the control electrode 30c of the switching element 30 of the upper arm.

FIG. 5E shows an example of the control signal inputted to the control electrode 30c of the switching element 30 of the lower arm.

In FIGS. 5D and 5E, one of the three phases is shown as an example.

As shown in FIGS. 4A to 5E, the absolute value of the upper limit value UL and the lower limit value LL is set higher than the maximum value of the amplitude of the inverter current flowing in the inverter 20 during the rated action. Thus, when the current determiner 50 has decided that the inverter current falls beyond the range between the upper limit value UL and the lower limit value LL, the controller 14 determines that the inverter current is an overcurrent. The upper limit value UL is, in other words, a positive threshold of the inverter current. The lower limit value LL is, in other words, a negative threshold of the inverter current. The decision signal outputted by the current determiner 50 is, in other words, a signal indicating whether the inverter current is an overcurrent. The absolute value of the upper limit value UL is e.g. equal to the absolute value of the lower limit value LL. The absolute value of the upper limit value UL may be different from the absolute value of the lower limit value LL.

In the converted value of the system current passed through the filter/transformer unit 22, the upper limit value UL is set lower than the operation range of the system current in which the controller 14 is subjected to an error stop. In the converted value of the system current passed through the filter/transformer unit 22, the lower limit value LL is set higher than the operation range of the system current in which the controller 14 is subjected to an error stop.

As shown in FIGS. 5C to 5E, when the current determiner 50 has decided that the inverter current falls beyond the range between the upper limit value UL and the lower limit value LL, the controller 14 stops the operation of each switching element 30. That is, the controller 14 stops the output of AC power from the inverter 20. Thus, overcurrent of the inverter current is suppressed. For instance, the controller 14 suppresses overcurrent by stopping the operation of each switching element 30 before being subjected to an error stop beyond the operation range of the system current. The controller 14 performs what is called the gate blocking of each switching element 30.

For instance, the controller 14 switches the operation signal from HIGH to LOW. Then, the controller 14 stops the operation of each switching element 30 by e.g. applying the second voltage to the control electrode 30c of each switching element 30.

For instance, the controller 14 stops all the switching elements 30 when it is decided that the inverter current of one of the phases falls beyond the range between the upper limit value UL and the lower limit value LL. In this example, the operation signal is set to HIGH when allowing the operation of each switching element 30. The operation signal is set to LOW when stopping the operation of each switching element 30. The setting of the operation signal may be opposite to the foregoing.

In the case where each switching element 30 is of the normally-off type, the operation of each switching element 30 may be stopped by stopping the input of the control signal to the control electrode 30c. For instance, the operation of each switching element 30 may be stopped by breaking the electrical connection between the controller 14 and the control electrode 30c using another switch and the like.

The controller 14 confirms the inverter current (the decision result of the current determiner 50) when the carrier signal CS takes a prescribed value after the controller 14 stops the operation of each switching element 30. For instance, the controller 14 confirms whether the inverter current falls within the range between the upper limit value UL and the lower limit value LL when the carrier signal CS is maximized and when the carrier signal CS is minimized. That is, the controller 14 confirms whether the inverter current has returned into a proper range.

When the inverter current has returned into the range between the upper limit value UL and the lower limit value LL, the controller 14 restores the operation signal from LOW to HIGH and resumes the operation of each switching element 30. That is, the controller 14 resumes the operation of each switching element 30 at the positive peak value (top) of the carrier signal CS or the negative peak value (bottom) of the carrier signal CS.

The timing of resuming the operation of each switching element 30 is not limited to the time when the carrier signal CS is maximized and when the carrier signal CS is minimized. For instance, when the carrier signal CS crosses zero, the inverter current may be confirmed to resume the operation of each switching element 30. The timing of resuming the operation of each switching element 30 may be the time when the carrier signal CS takes a prescribed value. For instance, in the case where the carrier signal CS takes positive and negative values, it is possible to use the time when the absolute value of the carrier signal CS takes a prescribed value.

Thus, when overcurrent of the inverter current is sensed, the operation of each switching element 30 is temporarily stopped. After the inverter current returns to a proper value, the operation of each switching element 30 is resumed. In the case of overcurrent due to instantaneous voltage drop, as described above, the temporary overcurrent is suppressed. Thus, after the system voltage returns to a proper value, the normal action can be restored. Accordingly, even when an instantaneous voltage drop occurs, the action can be continued without causing an error stop of the controller 14.

As described above, the frequency of the carrier signal CS is higher than the frequency of the voltage reference VR. That is, the frequency of the carrier signal CS is higher than the frequency of AC power of the power system 4. Thus, in the power conversion device 10, for instance, the time of stopping each switching element 30 can be suppressed to several cycles of the carrier signal CS. For instance, the time of stopping each switching element 30 can be suppressed to approximately several to several tens of microseconds.

For instance, there is known a power conversion device as follows. Gate blocking of each switching element and parameter initialization of the amount of control manipulation are performed based on the information of the system voltage. Thus, overcurrent at the time of instantaneous voltage drop is suppressed to continue action.

However, in the case of performing gate blocking based on the information of the system voltage, the time of stopping each switching element may amount to several milliseconds. In this case, it takes time to resume the operation of each switching element. Thus, there is concern about unnecessarily decreasing the output of the power conversion device.

In contrast, in the power conversion device 10 according to this embodiment, when overcurrent of the inverter current is sensed, the operation of each switching element 30 is stopped. After the inverter current returns to a proper value, the operation of each switching element 30 is resumed. Thus, in the power conversion device 10, the operation of each switching element 30 can be resumed in a shorter time than in the case of performing gate blocking based on the information of the system voltage. Accordingly, the power conversion device 10 can suppress the decrease of the output in the case of continuing action at the time of instantaneous voltage drop.

For instance, in the case where overcurrent occurs due to a cause different from instantaneous voltage drop, there is concern about sensing overcurrent again after resuming the operation of each switching element 30. Thus, for instance, the controller 14 may be subjected to an error stop when the process of sensing overcurrent and stopping the operation of each switching element 30 has consecutively occurred a plurality of times.

Returning to FIG. 3, the power calculator 51 is inputted with the inverter current detected by the first current detector 40, the system current detected by the second current detector 42, and the system voltage detected by the voltage detector 44. The power calculator 51 is inputted with e.g. the inverter current, the system current, and the system voltage of each phase.

The power calculator 51 calculates the output power of the main circuit unit 12 (power conversion device 10) based on the inverter current, the system current, and the system voltage inputted thereto. The power calculator 51 calculates e.g. the active power and the reactive power of the output power of the main circuit unit 12. The power calculator 51 inputs the calculated output power of the main circuit unit 12 to the power controller 52.

The power controller 52 is inputted with e.g. the output power of the main circuit unit 12 calculated by the power calculator 51, and a power command value. The power controller 52 is inputted with e.g. the power command value of active power and the power command value of reactive power. Each power command value is inputted from e.g. an upper-level controller for controlling the power system 4 to the power conversion device 10. Each power command value may be generated in the power conversion device 10. For instance, the DC voltage source 2 may be a solar cell panel. In this case, the power of the optimal operation point determined from the output voltage and the output current of the solar cell panel may be used as a power command value. The power command value inputted to the power controller 52 may be only the power command value of active power.

The power controller 52 calculates a current command value of the inverter current based on the output power and the power command values inputted thereto. The current command value of the inverter current is a current command value for bringing the output power of the main circuit unit 12 close to the power command value. The power controller 52 calculates the current command value of the inverter current by e.g. PI control. The current command value of the inverter current may be calculated using other control techniques such as PID control and I-P control. The power controller 52 inputs the calculated current command value of the inverter current to the current command value selector 53.

The current command value selector 53 is inputted with the current command value of the inverter current calculated by the power controller 52 and the decision signal of the current determiner 50. The current command value selector 53 includes a predetermined specified command value of the inverter current. The specified command value is e.g. a constant. In this example, the specified command value is zero. That is, in this example, the specified command value means preventing the inverter current from being outputted.

When the current determiner 50 has decided that the inverter current falls within the range between the upper limit value UL and the lower limit value LL, the current command value selector 53 inputs the current command value of the inverter current calculated by the power controller 52 to the current controller 54. On the other hand, when the current determiner 50 has decided that the inverter current falls beyond the range between the upper limit value UL and the lower limit value LL, the current command value selector 53 inputs the specified command value of the inverter current to the current controller 54. That is, when the current determiner 50 has decided that the inverter current falls beyond the range between the upper limit value UL and the lower limit value LL, the current command value selector 53 sets the current command value of the inverter current to zero. Thus, the current command value selector 53 selects one of the current command value calculated by the power controller 52 and the specified command value depending on the current value of the inverter current. Accordingly, the current command value selector 53 inputs the selected one to the current controller 54.

The current controller 54 is inputted with the current command value or the specified command value of the inverter current, and the inverter current detected by the first current detector 40. When the current command value of the inverter current calculated by the power controller 52 is inputted, the current controller 54 calculates a voltage command value of the output voltage of the inverter 20 (hereinafter referred to as inverter voltage) based on the current command value and the inverter current inputted thereto. On the other hand, when the specified command value of the inverter current is inputted, the current controller 54 calculates a voltage command value of the inverter voltage based on the specified command value and the inverter current inputted thereto. The voltage command value of the inverter voltage is calculated using e.g. PI control.

The controller 14 corrects the voltage reference VR based on the voltage command value of the inverter voltage calculated by the current controller 54. For instance, the controller 14 corrects at least one of the amplitude, phase, and DC voltage component of the voltage reference VR based on the voltage command value of the inverter voltage.

Accordingly, when the inverter current falls within the range between the upper limit value UL and the lower limit value LL, the output from the main circuit unit 12 is controlled depending on the power command value inputted to the power controller 52. Thus, the controller 14 performs a first operation for continuing action at the time of instantaneous voltage drop and a second operation for controlling the output of the main circuit unit 12.

On the other hand, when the inverter current falls beyond the range between the upper limit value UL and the lower limit value LL, the output from the main circuit unit 12 is controlled to a value corresponding to the specified command value. In this example, the output from the main circuit unit 12 is substantially set to zero. The controller 14 sets the amplitude of the voltage reference VR to zero when e.g. the specified command value is inputted. Thus, each switching element 30 is turned to the off-state, and the inverter current is substantially set to zero. That is, the output from the main circuit unit 12 is substantially set to zero.

Thus, when the inverter current falls beyond the range between the upper limit value UL and the lower limit value LL, the controller 14 stops the operation of each switching element 30 based on the control signal inputted to the control electrode 30c of the switching element 30. Furthermore, the controller 14 sets the current command value of the inverter current to the specified command value. In this example, the controller 14 sets the current command value of the inverter current to zero. Then, the controller 14 resumes the operation of each switching element 30. Subsequently, the controller 14 restores the current command value of the inverter current to the current command value calculated by the power controller 52. For instance, the controller 14 restores the current command value substantially at the same time as resuming the operation of each switching element 30. The timing of restoring the current command value is not limited thereto, but may be an arbitrary timing after resuming the operation of each switching element 30.

Thus, when overcurrent of the inverter current is sensed, the current command value of the inverter current is set to zero. This can suppress that the voltage command value of the inverter voltage is set to an abnormal value based on the inverter current of the overcurrent when e.g. resuming the operation of each switching element 30. Thus, for instance, the operation of the power conversion device 10 can be further stabilized.

For instance, there is known a power conversion device as follows. After gate blocking is performed upon sensing overcurrent, the current command value for the inverter circuit is decreased. Upon disabling the current command value, the command value is gradually increased to suppress overshoot. In this case, the output of the power conversion device decreases during the process of gradually increasing the current command value.

In contrast, in the power conversion device 10 according to this embodiment, for instance, the current command value of the inverter current is restored to the current command value calculated by the power controller 52 after deactivating gate blocking. Thus, the decrease of output can be further suppressed than in the case of gradually increasing the current command value. Furthermore, when overcurrent of the inverter current is sensed, the current command value of the inverter current is set to zero to suppress that the voltage command value of the inverter voltage is set to an abnormal value. Thus, overshoot of the system current (output current) can also be suppressed.

The specified command value of the inverter current is not limited to zero, but may be an arbitrary value. The specified command value is set to e.g. approximately 20% or less of the rated current of the inverter current. This can suppress e.g. anomaly of the voltage command value of the inverter voltage after resuming the operation of each switching element 30. However, the effect of suppressing overcurrent can be maximized by setting the specified command value to zero.

Second Embodiment

Figure 6:
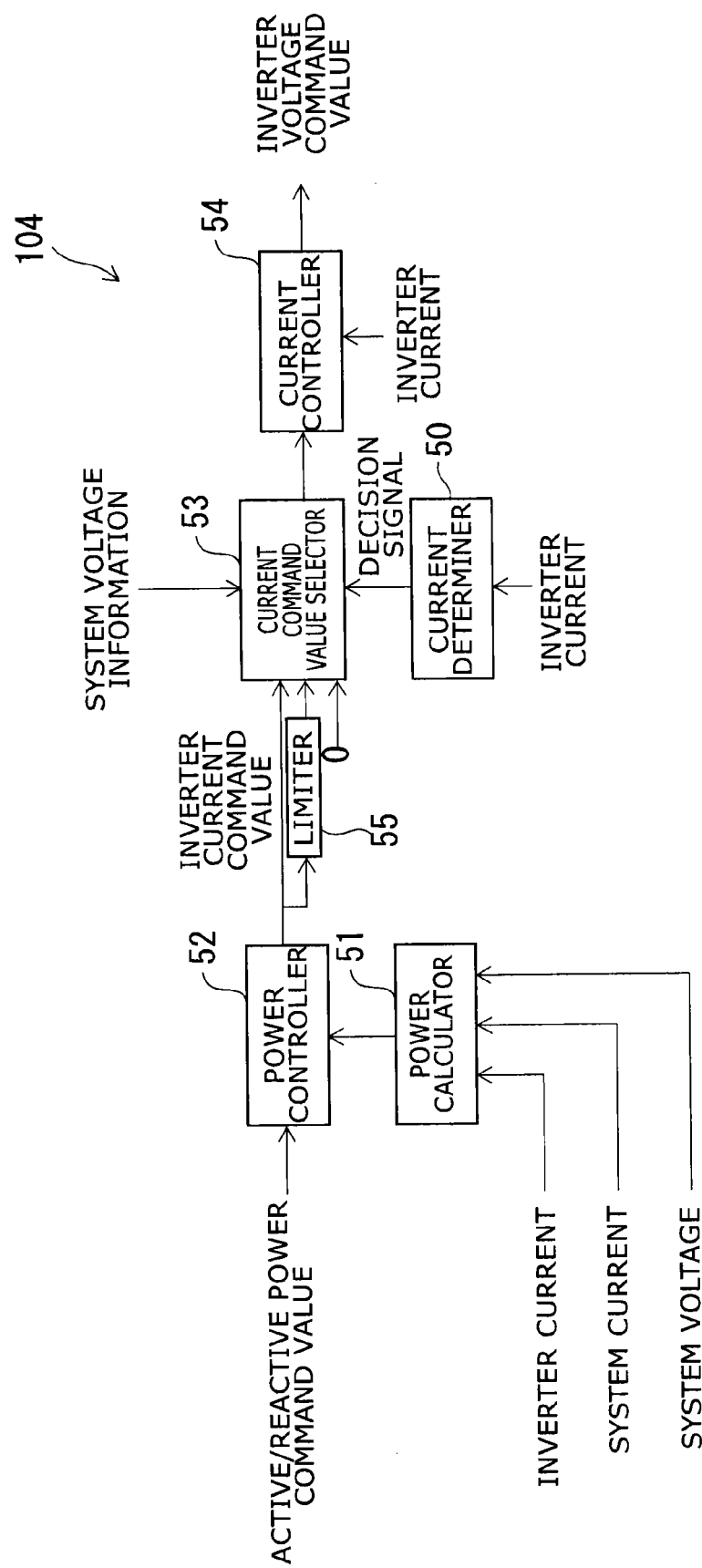
FIG. 6 is a functional block diagram schematically showing part of the controller according to a second embodiment.

FIG. 6 is a functional block diagram schematically showing part of the controller according to a second embodiment.

The components substantially the same in function or configuration as those of the above first embodiment are labeled with like reference numerals, and the detailed description thereof is omitted.

As shown in FIG. 6, the controller 104 includes a limiter 55. The limiter 55 is provided between the power controller 52 and the current command value selector 53. The limiter 55 is inputted with the current command value of the inverter current calculated by the power controller 52. When the inputted current command value of the inverter current is larger than a prescribed limit value, the limiter 55 limits the current command value of the inverter current to the limit value. Then, the limiter 55 inputs the limited current command value to the current command value selector 53. The limiter 55 limits the current command value to e.g. 150% or less of the rated current of the inverter current.

When the inverter current falls beyond the range between the upper limit value UL and the lower limit value LL, the controller 104 decides whether the system voltage is less than or equal to a prescribed value based on the detection value of the system voltage detected by the voltage detector 44. The controller 104 decides e.g. whether the remaining voltage ratio of the system voltage is less than 20%. That is, the controller 104 decides e.g. whether the system voltage is significantly decreased. The controller 104 defines system voltage information as the decision result of whether the system voltage is less than or equal to the prescribed value and inputs the system voltage information to the current command value selector 53.

When the controller 104 has decided that the system voltage is larger than the prescribed value, the controller 104 stops the operation of each switching element 30 as described above. On the other hand, when the controller 104 has decided that the system voltage is less than or equal to the prescribed value, the controller 104 continues the operation of each switching element 30.

The current command value selector 53 confirms whether the system voltage is less than or equal to the prescribed value based on the inputted system voltage information. When the system voltage is larger than the prescribed value, the current command value selector 53 selects the current command value calculated by the power controller 52 or the specified command value of the inverter current in response to the decision signal as described in the above embodiment.

On the other hand, when the system voltage is less than or equal to the prescribed value, the current command value selector 53 selects the current command value of the inverter current inputted from the limiter 55. The current command value selector 53 inputs the selected current command value to the current controller 54. That is, when the system voltage is significantly decreased, the current command value selector 53 inputs the current command value limited to the limit value to the current controller 54.

When the system voltage is significantly decreased, the operation of each switching element 30 may be allowed. On the other hand, when the system voltage is significantly decreased, there is concern that the power controller 52 calculates a significantly high current command value of the inverter current in order to respond to the power command value.

Thus, in this example, when the system voltage is significantly decreased, the operation of each switching element 30 is continued with the current command value of the inverter current limited to the prescribed limit value. This can further suppress the decrease of output in the case of e.g. continuing action at the time of instantaneous voltage drop. Furthermore, the limit value of the limiter 55 can be set sufficiently low. This can suppress another occurrence of overcurrent after the system voltage is recovered.

Third Embodiment

Figure 7:
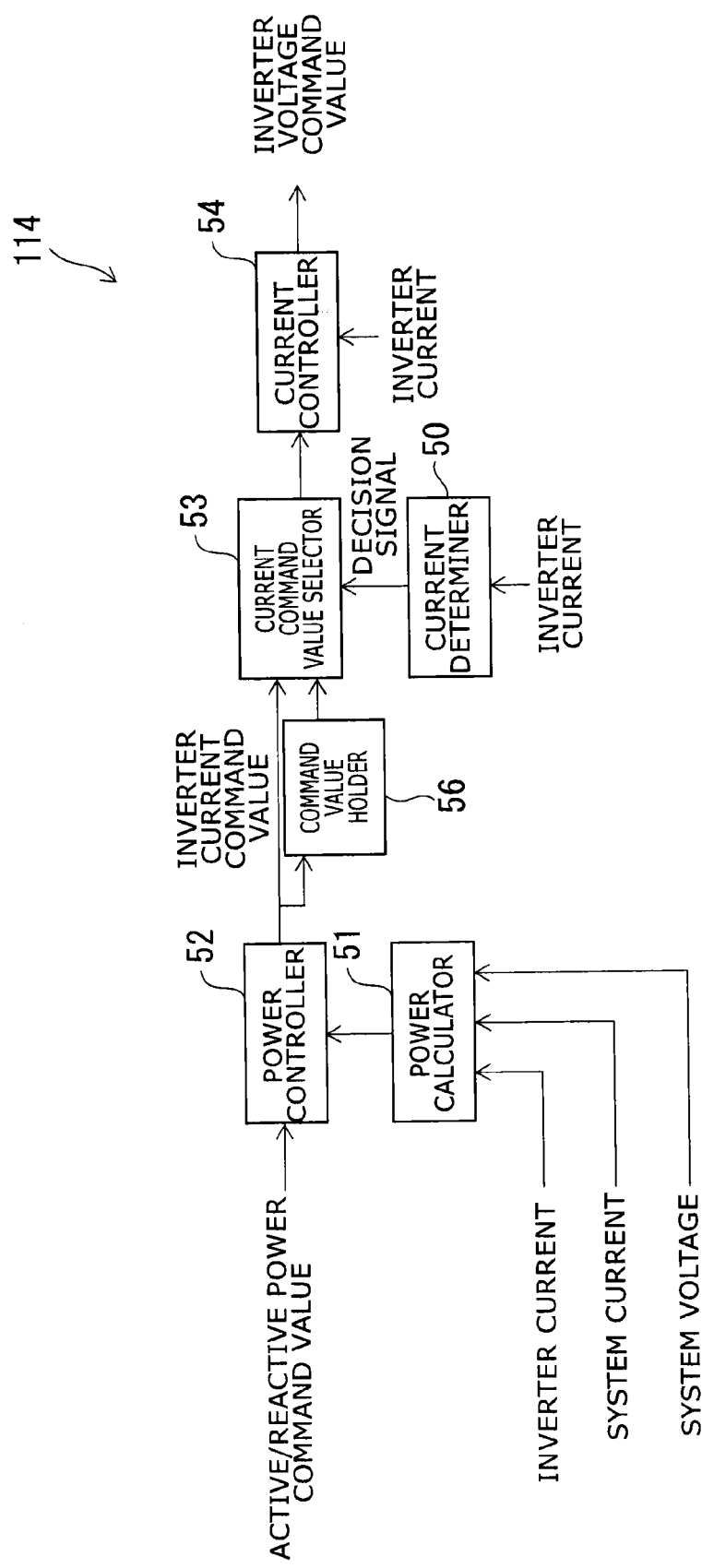
FIG. 7 is a functional block diagram schematically showing part of the controller according to a third embodiment.

FIG. 7 is a functional block diagram schematically showing part of the controller according to a third embodiment.

As shown in FIG. 7, the controller 114 includes a command value holder 56. The command value holder 56 is provided between the power controller 52 and the current command value selector 53. The command value holder 56 is inputted with the current command value of the inverter current calculated by the power controller 52. The command value holder 56 holds the current command value of the inverter current at normal time. The command value holder 56 inputs the held current command value to the current command value selector 53. The command value holder 56 holds e.g. the current command value of the inverter current immediately before overcurrent is sensed.

For instance, when the current determiner 50 has decided that the inverter current falls beyond the range between the upper limit value UL and the lower limit value LL, the command value holder 56 holds the current command value of the inverter current inputted just previously from the power controller 52. Then, when the current determiner 50 has decided that the inverter current has returned into the range between the upper limit value UL and the lower limit value LL, the command value holder 56 deactivates holding of the current command value.

When the current determiner 50 has decided that the inverter current falls within the range between the upper limit value UL and the lower limit value LL, the current command value selector 53 inputs the current command value of the inverter current calculated by the power controller 52 to the current controller 54. On the other hand, when the current determiner 50 has decided that the inverter current falls beyond the range between the upper limit value UL and the lower limit value LL, the current command value selector 53 inputs the current command value of the inverter current at normal time held by the command value holder 56 to the current controller 54.

Thus, the current command value of the inverter current set upon sensing overcurrent of the inverter current may be the current command value at normal time. Also in this example, the decrease of output in the case of continuing action at the time of instantaneous voltage drop can be suppressed as in the above first and second embodiments. For instance, it is possible to suppress that the voltage command value of the inverter voltage is set to an abnormal value based on the inverter current of the overcurrent when resuming the operation of each switching element 30.

Fourth Embodiment

Figure 8:
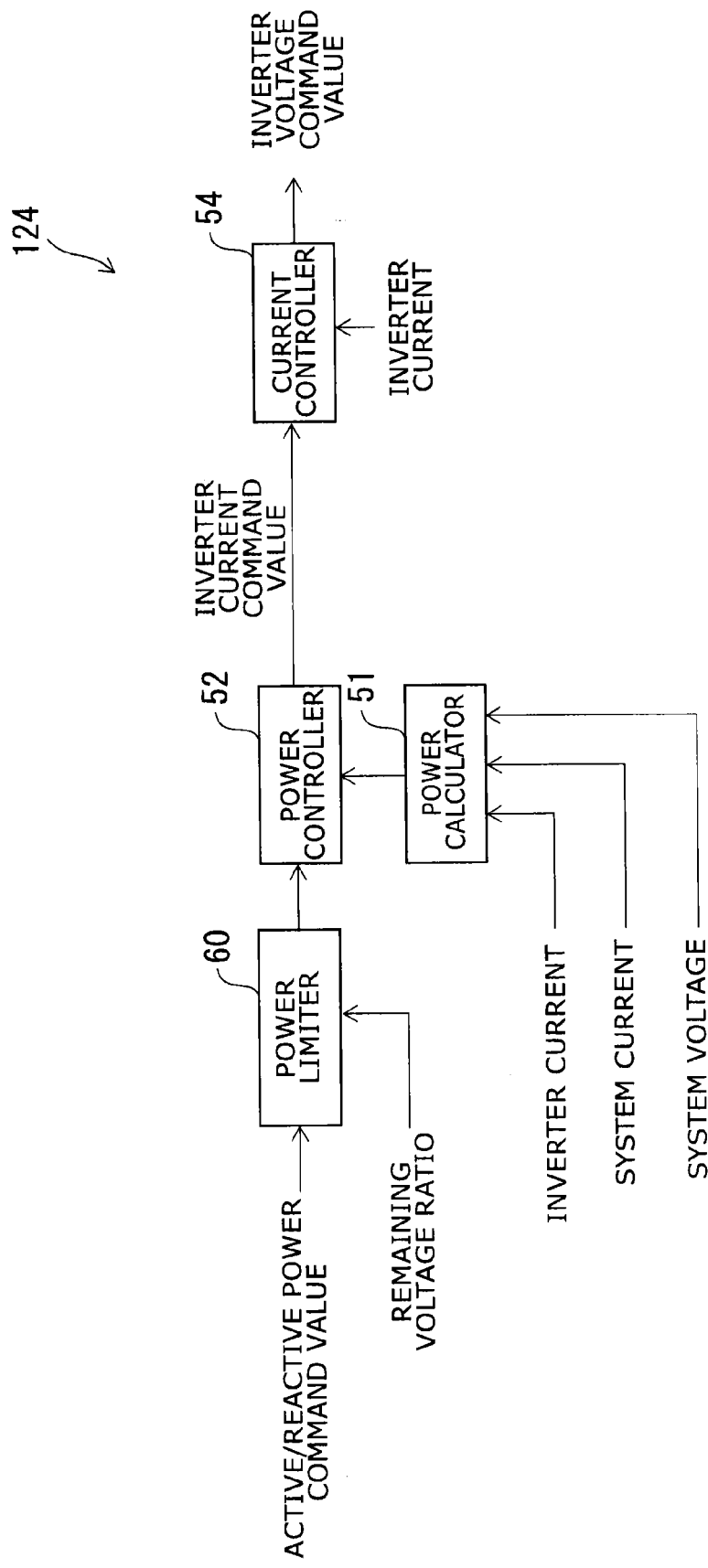
FIG. 8 is a functional block diagram schematically showing part of the controller according to a fourth embodiment.

FIG. 8 is a functional block diagram schematically showing part of the controller according to a fourth embodiment.

As shown in FIG. 8, the controller 124 includes a power limiter 60. The power limiter 60 is connected to the power controller 52.

The power limiter 60 is inputted with the power command value of active power and reactive power and the information of remaining voltage ratio. The power limiter 60 limits the power command value depending on the remaining voltage ratio. The power limiter 60 inputs the limited power command value to the power controller 52. The information of remaining voltage ratio may be e.g. the detection value of the system voltage detected by the voltage detector 44. That is, the power limiter 60 may calculate the remaining voltage ratio based on the detection value of the system voltage.

The power limiter 60 limits the power command value so that e.g. the rated power (output power) of the main circuit unit 12 has a value corresponding to the remaining voltage ratio. That is, the power limiter 60 limits the output power of the main circuit unit 12 to a value corresponding to the remaining voltage ratio. For instance, consider a case where an instantaneous voltage drop with a remaining voltage ratio of 20% has occurred when the main circuit unit 12 outputs power with a rated power of 100%, i.e., with a rated current of 100%. In this case, maintaining an output of 100% requires increasing the rated current to 500%. Thus, the power limiter 60 limits the rated power of the main circuit unit 12 to 20%. On the other hand, consider a case where an instantaneous voltage drop with a remaining voltage ratio of 20% has occurred when the main circuit unit 12 outputs power with a rated power of 20%, i.e., with a rated current of 20%. In this case, a rated power of 20% equal to that at normal time can be outputted by setting the rated current to 100%. For instance, it is also possible to increase the current command value in order to suppress the decrease of output power even at the time of occurrence of instantaneous voltage drop.

The power controller 52 calculates the current command value of the inverter current based on the power command values inputted from the power limiter 60. Then, the power controller 52 inputs the calculated current command value of the inverter current to the current controller 54. In the controller 124, the current command value selector 53 is omitted. The current controller 54 calculates a voltage command value of the inverter voltage based on the current command value of the inverter current calculated by the power controller 52 and the inverter current.

Also in this example, the decrease of output in the case of continuing action at the time of instantaneous voltage drop can be suppressed. For instance, in the case where the rated power of the main circuit unit 12 is set low, the power equal to that at normal time can be outputted even at the time of occurrence of instantaneous voltage drop. For instance, it is also possible to suppress that the voltage command value of the inverter voltage is set to an abnormal value.

Fifth Embodiment

Figure 9:
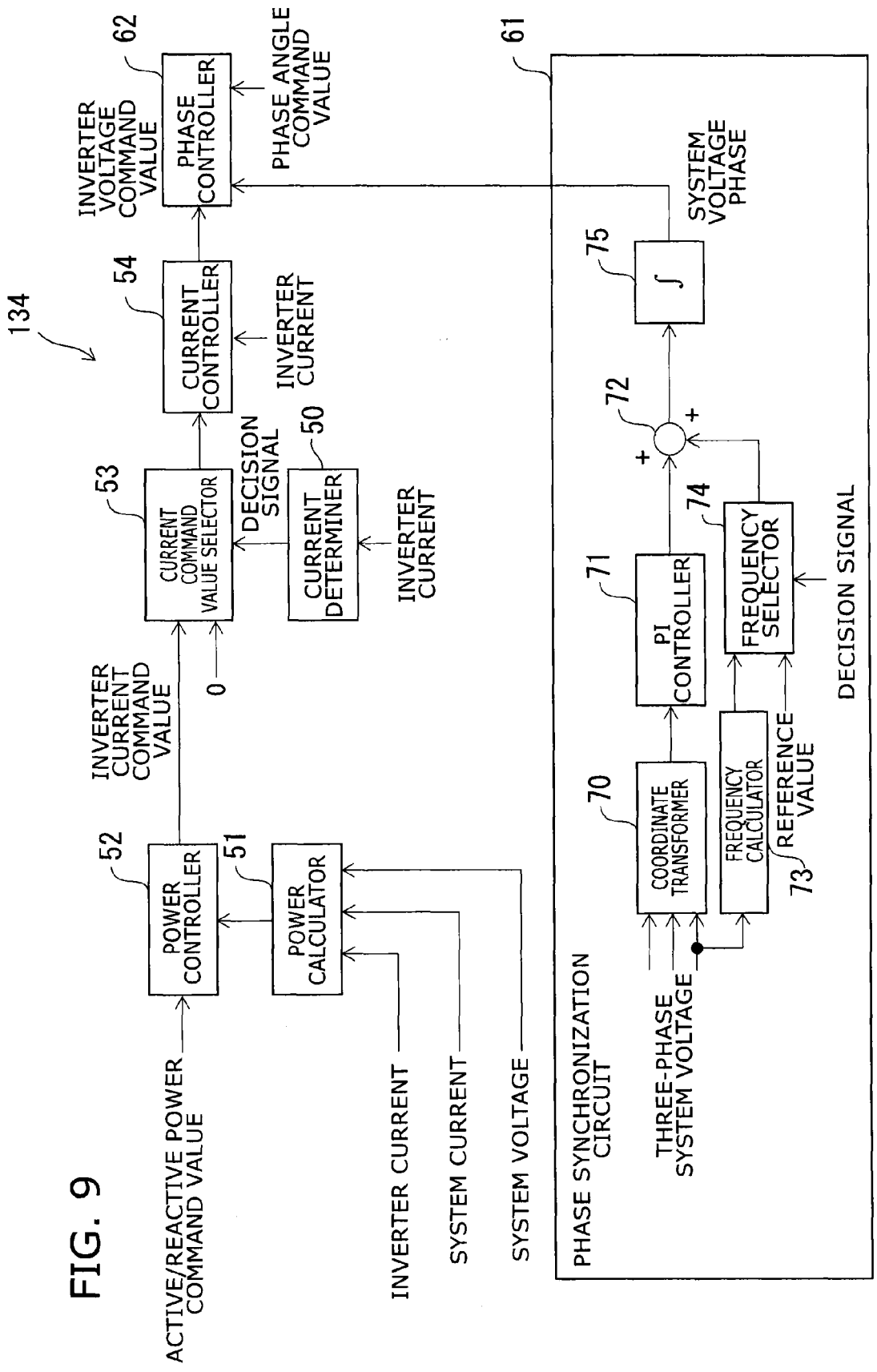
FIG. 9 is a functional block diagram schematically showing part of the controller according to a fifth embodiment.

FIG. 9 is a functional block diagram schematically showing part of the controller according to a fifth embodiment.

As shown in FIG. 9, the controller 134 includes a phase synchronization circuit 61 and a phase controller 62. In this example, the portion of the controller 134 other than the phase synchronization circuit 61 and the phase controller 62 is substantially the same as the controller 14 of the first embodiment. The portion of the controller 134 other than the phase synchronization circuit 61 and the phase controller 62 may be substantially the same as the controller 104, the controller 114, or the controller 124.

The phase synchronization circuit 61 is connected to the phase controller 62. The phase synchronization circuit 61 detects the phase of the system voltage of the power system 4. The phase synchronization circuit 61 inputs the detected system voltage phase to the phase controller 62. The phase synchronization circuit 61 is what is called PLL (phase locked loop).

The phase controller 62 is connected to the phase synchronization circuit 61 and the current controller 54. The phase controller 62 is inputted with the voltage command value of the inverter voltage calculated by the current controller 54 and the system voltage phase detected by the phase synchronization circuit 61. Furthermore, the phase controller 62 is inputted with a phase angle command value of the system voltage. The phase angle command value is calculated based on e.g. the system current detected by the second current detector 42 and the system voltage detected by the voltage detector 44. The phase angle command value may be calculated by the phase controller 62 by e.g. inputting the detection value of the system current and the detection value of the system voltage to the phase controller 62.

The phase controller 62 corrects the voltage reference VR based on the voltage command value, the phase angle command value, and the system voltage phase inputted thereto. Thus, the phase controller 62 brings the voltage value of the voltage outputted from the main circuit unit 12 close to the voltage command value. Furthermore, the phase controller 62 brings the phase of the voltage outputted from the main circuit unit 12 close to the phase angle command value. That is, the phase controller 62 brings the voltage value of the output voltage of the main circuit unit 12 close to the voltage of the system voltage. Furthermore, the phase controller 62 brings the phase of the output voltage of the main circuit unit 12 close to the phase of the system voltage. In other words, the phase controller 62 synchronizes the phase of the output voltage of the main circuit unit 12 with the phase of the system voltage.

The phase synchronization circuit 61 includes a coordinate transformer 70, a PI controller 71, an adder 72, a frequency calculator 73, a frequency selector 74, and an integrator 75.

The coordinate transformer 70 is inputted with the detection value of the system voltage of each phase detected by the voltage detector 44. The coordinate transformer 70 transforms the detection value of the three-phase system voltage to a two-phase voltage signal. Furthermore, the coordinate transformer 70 transforms the two-phase voltage signal of the stationary coordinate system to that of the rotational coordinate system rotating at the same frequency as the system voltage. For instance, the coordinate transformer 70 transforms the two-phase voltage signal to a signal of the direct axis component (d-axis signal) and a signal of the quadrature axis component (q-axis signal) of the rotational coordinate system. The coordinate transformer 70 performs what is called the dq-transformation on the detection value of the three-phase system voltage. The d-axis signal is e.g. the active component of the system voltage. The q-axis signal is e.g. the reactive component of the system voltage. The coordinate transformer 70 is connected to the PI controller 71. The coordinate transformer 70 inputs the transformed d-axis signal and q-axis signal to the PI controller 71.

The PI controller 71 performs PI control (proportional integral control) on the d-axis signal and the q-axis signal inputted thereto. The PI controller 71 performs PI control so that one of the d-axis signal and the q-axis signal is substantially set to zero. The PI controller 71 performs PI control so that e.g. the q-axis signal is substantially set to zero. Thus, the PI controller 71 calculates e.g. the amount of frequency correction from the d-axis signal and the q-axis signal. The PI controller 71 is connected to the adder 72. The PI controller 71 inputs the calculation result of PI control to the adder 72.

The frequency calculator 73 is inputted with one phase of the three-phase system voltage. The frequency calculator 73 calculates the frequency of the system voltage by e.g. detecting the zero cross point of the inputted system voltage and calculating the time between a plurality of zero cross points. The frequency calculator 73 is connected to the frequency selector 74. The frequency calculator 73 inputs the calculated frequency to the frequency selector 74.

The frequency selector 74 is connected to each of the current determiner 50, the adder 72, and the frequency calculator 73. The frequency selector 74 is inputted with the frequency of the system voltage calculated by the frequency calculator 73 and the decision signal of the current determiner 50. The frequency selector 74 includes a reference value of the frequency of the system voltage. The reference value is e.g. 50 Hz or 60 Hz.

When the current determiner 50 has decided that the inverter current falls within the range between the upper limit value UL and the lower limit value LL, the frequency selector 74 inputs the reference value to the adder 72. On the other hand, when the current determiner 50 has decided that the inverter current falls beyond the range between the upper limit value UL and the lower limit value LL, the frequency selector 74 inputs the frequency calculated by the frequency calculator 73 to the adder 72.

The adder 72 is connected to the integrator 75. The adder 72 adds the frequency inputted from the frequency selector 74 to the calculation result of the PI controller 71. The adder 72 inputs the addition result to the integrator 75. The adder 72 adds the frequency calculated by the frequency calculator 73 or the reference value to the calculation result of the PI controller 71. That is, the adder 72 calculates a system voltage frequency.

The integrator 75 calculates a system voltage phase from the addition result by integrating the addition result of the adder 72. That is, the integrator 75 calculates a system voltage phase by integrating the system voltage frequency. The integrator 75 is connected to the phase controller 62. The integrator 75 inputs the calculated system voltage phase to the phase controller 62. The phase controller 62 corrects the voltage reference VR as described above based on the system voltage phase inputted from the integrator 75.

When an instantaneous voltage drop occurs, the frequency of the system voltage may be varied. In this context, the controller 134 calculates the frequency of the system voltage and calculates the system voltage phase based on the frequency. Then, the phase controller 62 corrects the voltage reference VR based on the calculated system voltage phase. Thus, also in the case where the frequency is varied with the occurrence of instantaneous voltage drop, the phase of the output voltage of the main circuit unit 12 can be appropriately synchronized with the phase of the system voltage. For instance, the operation of the power conversion device 10 can be further stabilized.

In the controller 134, the frequency selector 74 selects a frequency based on the decision signal of the current determiner 50. The controller 134 is not limited thereto. For instance, the detection value of the system voltage detected by the voltage detector 44 may be inputted to the frequency selector 74. Thus, frequency selection may be performed based on the detection value of the system voltage. For instance, when the detection value of the system voltage is more than or equal to a prescribed threshold, the reference value is selected. When the detection value of the system voltage is less than the threshold, the frequency calculated by the frequency calculator 73 is selected. Thus, an instantaneous voltage drop may be detected based on the detection value of the system voltage. At the time of occurrence of instantaneous voltage drop, the frequency calculated by the frequency calculator 73 may be selected. Alternatively, the frequency selector 74 may be omitted. The system voltage phase may be constantly calculated based on the frequency calculated by the frequency calculator 73.

Figure 10:
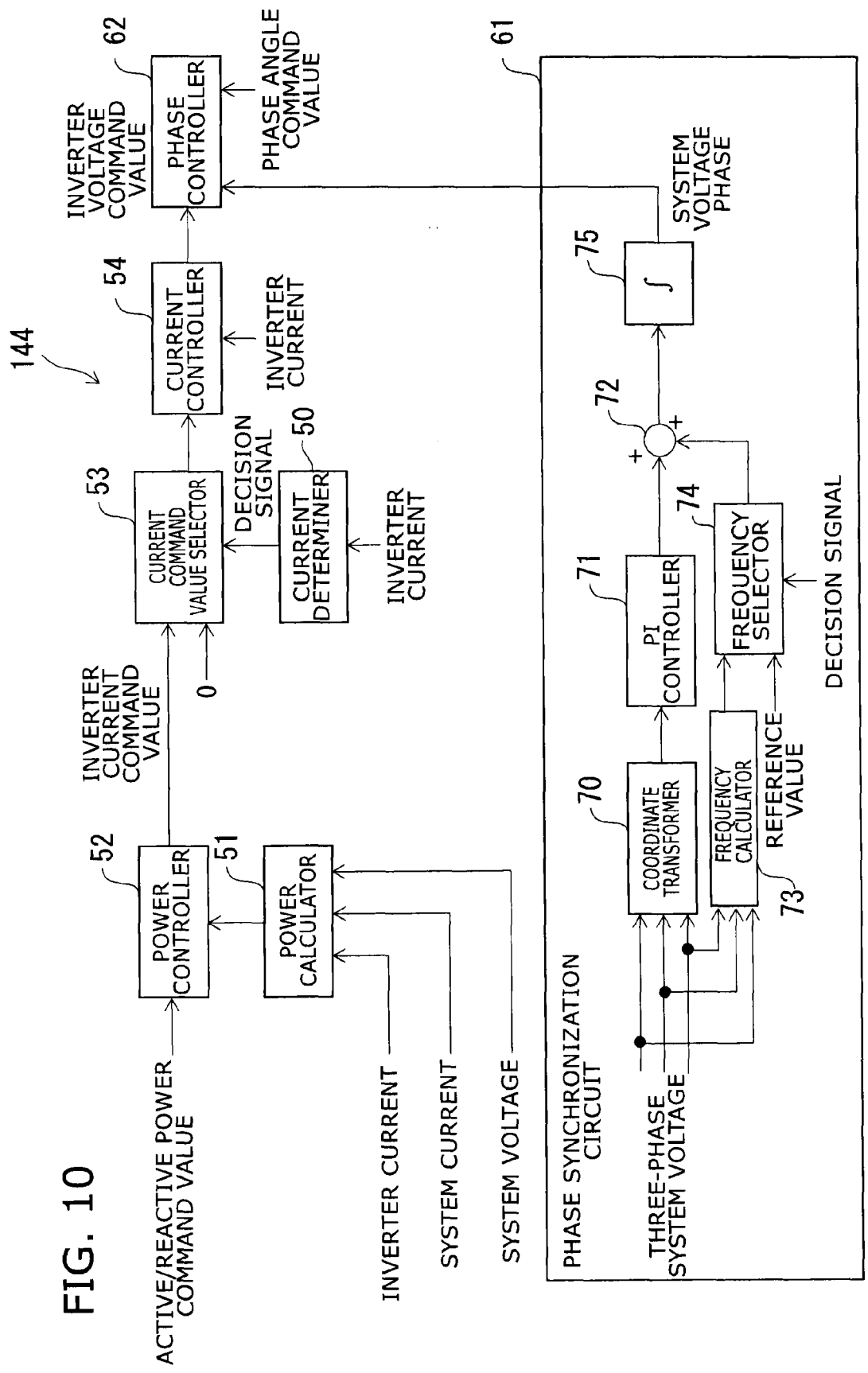
FIG. 10 is a functional block diagram schematically showing part of an alternative controller according to the fifth embodiment.

FIG. 10 is a functional block diagram schematically showing part of an alternative controller according to the fifth embodiment.

As shown in FIG. 10, in the controller 144, each of the three-phase system voltages is inputted to the frequency calculator 73. In this example, the frequency calculator 73 calculates the average frequency of the three-phase system voltages and inputs the average frequency to the frequency selector 74.

Thus, in the case where the system voltage is three-phase AC, the calculated frequency of the system voltage may be the average of the frequencies of the phases. This can suppress e.g. an abrupt change of the calculated frequency due to abrupt change of the phase. In the case where the system voltage is single-phase AC, the single-phase AC frequency only needs to be calculated by the frequency calculator 73. In the case where the system voltage is single-phase AC, PI control only needs to be performed on the single-phase AC system voltage.

Sixth Embodiment

Figure 11:
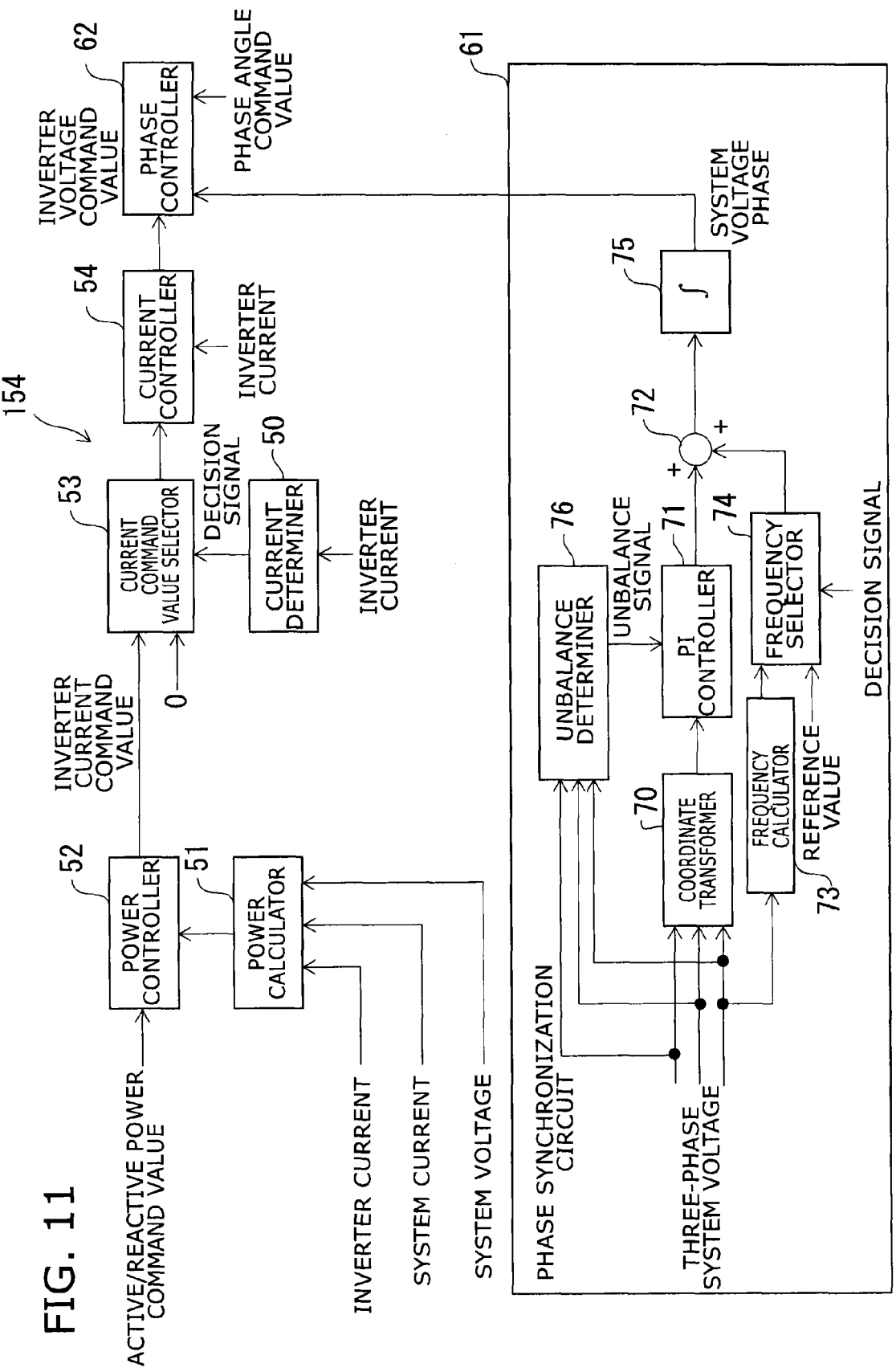
FIG. 11 is a functional block diagram schematically showing part of the controller according to a sixth embodiment.

FIG. 11 is a functional block diagram schematically showing part of the controller according to a sixth embodiment.

As shown in FIG. 11, in the controller 154, the phase synchronization circuit 61 further includes an unbalance determiner 76.

The unbalance determiner 76 is inputted with the detection value of the system voltage of each phase detected by the voltage detector 44. The unbalance determiner 76 decides the occurrence of unbalanced instantaneous voltage drop based on the detection value of the system voltage of each phase. Here, the unbalanced instantaneous voltage drop refers to an instantaneous voltage drop in which the value of the amplitude changes in the system voltage of each phase.

The unbalance determiner 76 determines e.g. the difference of the maximum of the amplitude of the system voltage for each phase. Then, when the difference of the maximum is more than or equal to a prescribed value, the unbalance determiner 76 decides that an unbalanced instantaneous voltage drop has occurred. The unbalance determiner 76 is connected to the PI controller 71. The unbalance determiner 76 inputs the above decision result as an unbalance signal to the PI controller 71.

When the unbalance determiner 76 has decided the occurrence of unbalanced instantaneous voltage drop, the PI controller 71 decreases at least one of the gain of the proportional term and the gain of the integral term in PI control.

When an unbalanced instantaneous voltage drop occurs, the d-axis signal and the q-axis signal outputted from the coordinate transformer 70 may oscillate at twice the frequency of the system voltage. At this time, if PI control is performed with the same gain as that at normal time, for instance, the system voltage phase oscillates. This distorts e.g. the output current of the main circuit unit 12. On the other hand, if the gain of PI control is set low, the followability of the system voltage to phase variation is decreased.

In contrast, in the controller 154, the gain of PI control is set relatively high at normal time. The gain of PI control is decreased at the time of occurrence of unbalanced instantaneous voltage drop. This can suppress e.g. the decrease of followability of the system voltage to phase variation at normal time. Furthermore, distortion of the output current of the main circuit unit 12 can be suppressed at the time of occurrence of unbalanced instantaneous voltage drop. The operation of the power conversion device 10 can be further stabilized.

The gain of PI control may be changed between two levels depending on whether an unbalanced instantaneous voltage drop occurs. Alternatively, the gain of PI control may be changed stepwise depending on the degree of unbalance of the unbalanced instantaneous voltage drop. For instance, the gain of PI control is decreased with the increase of the degree of unbalance (the difference of the maximum of the amplitude of the system voltage). This can suppress more appropriately e.g. the distortion of the output current of the main circuit unit 12. The operation of the power conversion device 10 can be further stabilized.

In the controller 154, as in the controller 134, the frequency calculator 73 calculates the frequency using one phase of the three-phase system voltage. The controller 154 is not limited thereto. As in the controller 144 shown in FIG. 10, the frequency calculator 73 may calculate the average frequency of the three-phase system voltages.

The embodiments provide a power conversion device suppressing the decrease of output in the case of continuing action at the time of instantaneous voltage drop.

The embodiments of the invention have been described above with reference to examples. However, the embodiments of the invention are not limited to these examples. For instance, any specific configurations of various components such as the switching element, inverter, main circuit unit, first current detector, controller, voltage detector, and second current detector included in the power conversion device are encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

Moreover, all power conversion devices practicable by an appropriate design modification by one skilled in the art based on the power conversion devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A power conversion device comprising:
   a main circuit unit connected to a DC voltage source and an AC power system, the main circuit unit including an inverter, the inverter including a plurality of switching elements, the main circuit unit converting a DC power supplied from the DC voltage source to an AC power adapted to the AC power system by turning on/off of the switching elements, the main circuit unit outputting the AC power to the AC power system;
   a first current detector detecting an output current of the inverter;
   a second current detector detecting a current of the AC power system;
   a voltage detector detecting a voltage of the AC power system; and
   a controller controlling on/off of the switching elements based on a voltage reference and a carrier signal, the voltage reference and the carrier signal being periodically changed,
   a frequency of the carrier signal being higher than a frequency of the voltage reference,
   the controller being configured to perform a first operation and a second operation,
   the first operation having
      deciding that whether the output current of the inverter falls within a range between an upper limit value and a lower limit value,
      stopping an operation of the switching elements when the output current of the inverter falls beyond the range,
      confirming the output current of the inverter when the carrier signal takes a prescribed value after the controller stops the operation of the switching elements, and
      resuming the operation of the switching elements when the output current of the inverter returns into the range,
   the second operation having
      calculating an output power of the main circuit unit based on the output current of the inverter detected by the first current detector, the current of the AC power system detected by the second current detector, and the voltage of the AC power system detected by the voltage detector,
      calculating a current command value of the output current of the inverter from the output power of the main circuit unit, and
      controlling an output of the main circuit unit by correcting the voltage reference based on the current command value of the output current of the inverter.

2. The device according to claim 1, wherein the controller confirms whether the output current of the inverter falls within the range between the upper limit value and the lower limit value when the carrier signal is maximized and when the carrier signal is minimized after the controller stops the operation of the switching elements.

3. The device according to claim 1, wherein the controller sets the current command value to a specified command value when the output current of the inverter falls beyond the range between the upper limit value and the lower limit value.

4. The device according to claim 3, wherein the specified command value is zero.

5. The device according to claim 3, wherein the controller restores the specified command value to the current command value calculated from the output power after resuming the operation of the switching elements.

6. The device according to claim 5, wherein the controller restores the current command value simultaneously with resuming the operation of the switching elements.

7. The device according to claim 1, wherein the controller limits the current command value when the voltage of the AC power system is less than or equal to a prescribed value.

8. The device according to claim 7, wherein the controller limits the current command value when a remaining voltage ratio of the voltage of the AC power system is less than 20%.

9. The device according to claim 1, wherein
the controller holds the current command value at a normal time, and
the controller sets the current command value at the normal time when the output current of the inverter falls beyond the range between the upper limit value and the lower limit value.

10. The device according to claim 1, wherein the controller limits the output power of the main circuit unit to a value corresponding to a remaining voltage ratio of the voltage of the AC power system.

11. The device according to claim 1, wherein
the controller calculates a frequency of the voltage of the AC power system, performs a proportional integral control on the voltage of the AC power system, adds the calculated frequency to a calculation result of the proportional integral control, and integrates a result of the addition,
the controller detects a phase of the voltage of the AC power system by integrating the result of the addition, and
the controller corrects the voltage reference based on the detected phase and the current command value.

12. The device according to claim 11, wherein
a power of the AC power system is a three-phase AC power,
the voltage detector detects each of the three-phase voltages of the AC power system, and
the controller transforms a detection value of the three-phase voltages to a two-phase voltage signal, transforms the two-phase voltage signal to a signal of a rotational coordinate system, performs the proportional integral control on the signal of the rotational coordinate system, and calculates the frequency from the voltage of at least one phase of the three-phase voltages.

13. The device according to claim 12, wherein the controller calculates an average frequency of the three-phase voltages.

14. The device according to claim 12, wherein the controller decreases at least one of a gain of a proportional term and a gain of an integral term in the proportional integral control when an unbalanced instantaneous voltage drop occurs.

15. The device according to claim 14, wherein the controller determines a difference of a maximum of an amplitude of the three-phase voltages for each phase and decides that the unbalanced instantaneous voltage drop has occurred when the difference of the maximum is more than or equal to a prescribed value.

16. The device according to claim 1, wherein the controller detects an anomaly of the AC power system based on a detection result of the second current detector and a detection result of the voltage detector, performs the first operation when the voltage and the current of the AC power system fall within a prescribed operation range, and stops the operation of the main circuit unit when the voltage and the current of the AC power system fall outside the operation range.

17. The device according to claim 16, wherein the controller determines that the voltage and the current of the AC power system fall outside the operation range when a state of a remaining voltage ratio of 20% or less is continued longer than 1 second.

18. The device according to claim 16, further comprising:
an internal power supply supplies a power to the controller in the operation range.

19. The device according to claim 1, wherein
the voltage reference is shaped like a sine wave, and
the carrier signal is shaped like a triangular wave.

20. The device according to claim 1, wherein the carrier signal has a frequency of 1 kHz or more.

* * * * *